Oct. 8, 1929.  P. W. TIERNEY  1,730,956
FOCUSING SCALE FOR PHOTOGRAPHIC CAMERAS
Filed June 29, 1928
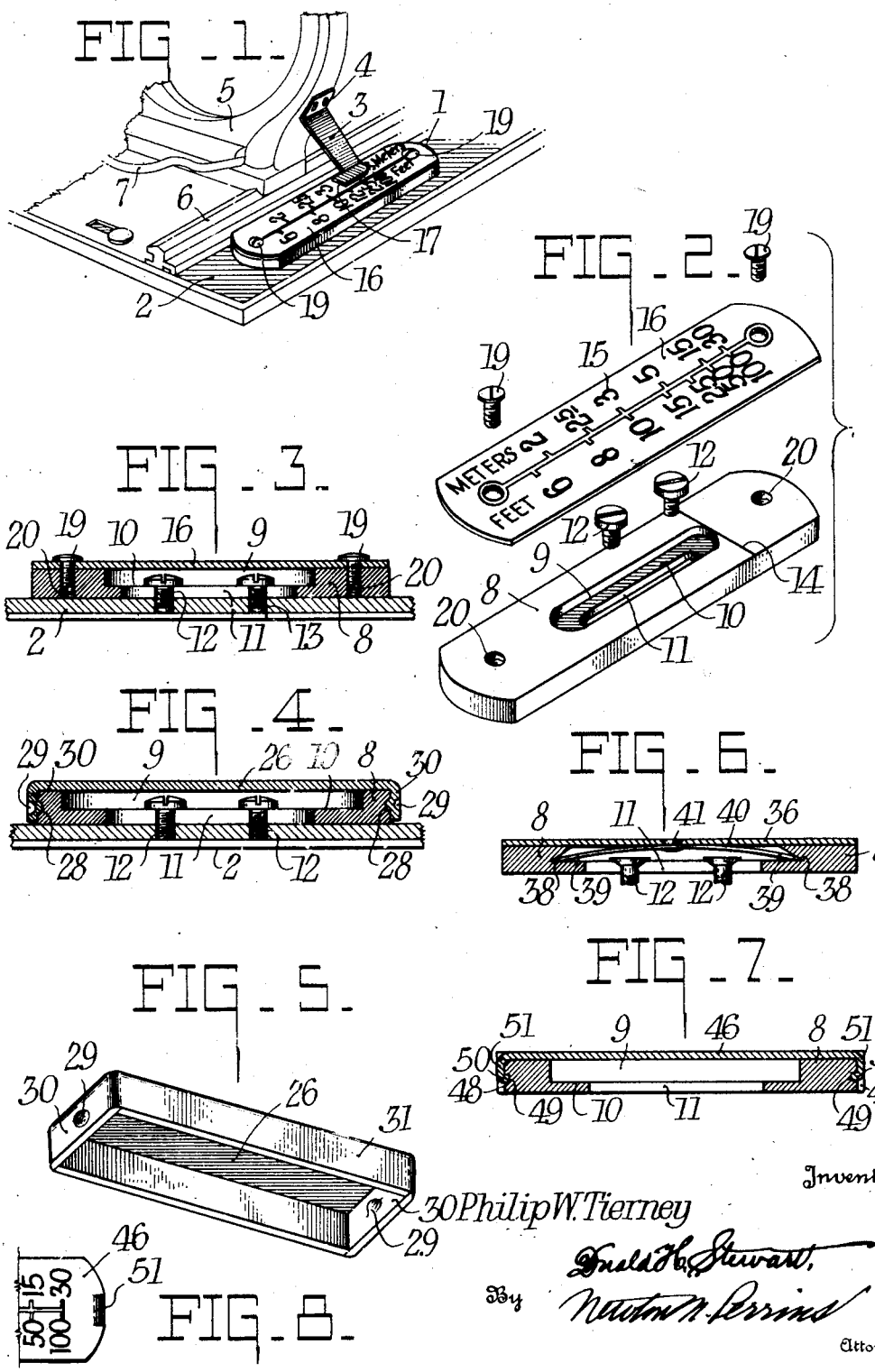
Inventor
Philip W. Tierney
By
Attorneys Patented Oct. 8, 1929

1,730,956

UNITED STATES PATENT OFFICE

PHILIP W. TIERNEY, OF ROCHESTER, NEW YORK, ASSIGNOR TO EASTMAN KODAK COMPANY, OF ROCHESTER, NEW YORK, A CORPORATION OF NEW YORK

FOCUSING SCALE FOR PHOTOGRAPHIC CAMERAS

Application filed June 29, 1928. Serial No. 289,171.

This invention relates to photography and more particularly to focusing scales for cameras. One object of my invention is to provide a focusing scale having a concealed adjustment with the camera part on which it is mounted. Another object is to provide a focusing scale which is neat in appearance and which is simple to position in assembling. Another object of my invention is to provide a focusing scale which is liable to remain in proper adjustment, and other objects will appear from the following specification, the novel features being particularly pointed out in the claims at the end thereof.

Coming now to the drawings, wherein like reference characters denote like parts throughout,—

Fig. 1 is a perspective view of a portion of a camera showing a focusing scale constructed in accordance with and embodying one form of my invention;

Fig. 2 is a perspective view of the parts of the focusing scale before being assembled into the position shown in Fig. 1;

Fig. 3 is a longitudinal sectional view through the focusing scale shown in Fig. 1;

Fig. 4 is a similar section through a focusing scale constructed in accordance with another embodiment of my invention;

Fig. 5 is a perspective view of the top plate used in the scale as shown in Fig. 4;

Fig. 6 is a similar view of still another embodiment of my invention;

Fig. 7 is a section through a scale constructed in accordance with still another embodiment of my invention; and Fig. 8 is a fragmentary plan view of the end of the focusing scale shown in Fig. 7.

There are considerable variations in the focal lengths of objectives originally designed to be of the same focal length and consequently it is necessary to provide a focusing scale which can readily be adjusted on the camera to which it is to be applied. If the adjusting means is obvious, it frequently happens that the camera user alters the adjustment and thus positions the scale in the wrong place. My invention is designed to overcome these difficulties by concealing the adjustment so that the factory adjustment of the movable parts cannot readily be tampered with.

As shown in Fig. 1, the focusing scale designated broadly as 1, may be mounted on a camera part, such as a camera bed 2, there being a pointer 3, here shown as being connected at 4 with a lens carriage 5, which may move upon a track 6 and which may be locked in a fixed position by means of the handle 7.

I prefer to form my focusing scale in the following manner: A base 8 is provided in the form of a block or box-like structure having a central aperture 9 from the lower portion of which a flange 10 extends, leaving a narrow opening 11 through the bottom of the base, this opening being adapted to receive screws 12, which may pass into suitable tapped openings 13 in the camera bed 2. By adjusting these screws, the base 8 may be moved back and forth on the bed and may be properly positioned in the following manner:

On the top side of the bed there is a graduation or line 14 which is placed at a definite focal distance corresponding to a focal distance on the scale 15, which is carried by the top or cover plate 16. I have here shown line 14 as corresponding to the focal distance for twenty-five feet on the scale 15, although obviously any desired distance may be employed. By bringing the foot 17 of the pointer 3 opposite the graduation 14, after properly focusing the objective on twenty-five feet, the screws 12 may be tightened, thus permanently attaching the base 8 to the camera bed 2. It is then only necessary to attach plate 16 by means of screws 19, which enter the tapped openings 20 in the base 8 to complete the assembling operation, since the line 14 coincides with the graduation for twenty-five feet, as above described.

It will then appear to the camera user that the scale 15 is screwed directly upon the bed 2 and as a change in the position of the scale would apparently require a new tapped opening in the bed 2, there is very little liability of the operator attempting to alter the scale adjustment.

While I have shown the scale 16 to be attached to the box-like housing 8, by means of screws in the first three figures, a concealed catch may be employed if desired. As shown in Fig. 4, the base 8 may be equipped with notches 28 at the end into which protuberances 29 on the end flanges 30 of the scale plate 26 may snap.

As best shown in Fig. 5, scale plate 26 is in the form of a box-like housing having end walls 30 and side walls 31 adapted to closely fit over the base 28. The end walls may either have sufficient spring to snap into position when the protuberances 29 reach apertures 28 or the end walls may be clamped into this position by means of a suitable clamping tool. The connection between the block 8 and the camera part 2 is the same as that previously described.

In Figure 6 another type of concealed fastening device for the cover plate 36 is shown, where the base block 8 is provided with undercut edge walls 38 which are adapted to receive the ends 39 of a spring member 40 attached by a rivet 41 to the cover plate 36. A special tool is required to move the spring ends into a position in which they may be inserted into their notches 38. But in case of an improper factory adjustment, the cover 36 may be sprung off of the block 8 so that the initial adjustment may be corrected.

In Figure 7 still another type of snap connection between a cover plate 46 and a base block 8 is shown. Here the base block 8 is provided with grooves 48 at the ends, the inner wall of these grooves having small openings 49 adapted to be engaged by protuberances 50 on tongues 51 bent from the metal of the cover plate 46, as best shown in Figure 8. The tongues 51 may be either sprung or clamped into the position shown in Figure 7, and like the cover plates shown in the other figures, may be removed if necessary.

From the above description it will be seen that a focusing plate constructed in accordance with my invention does not disclose to the user the fact that there is an easy means of adjusting the scale relative to the camera. For this reason the scale is liable to stay in proper adjustment and yet is so constructed that the initial adjustment or an additional adjustment after inspection can be readily made.

With the scale as shown in the first three figures, the base block can conveniently be made of bakelite, or some other condensation product, since these can readily be obtained in the necessary colors to correspond with the color of the camera and present a finished appearance. However, I do not limit myself to any particular material. The cover plate I prefer to form of metal in the form of an etched plate although, of course, other materials may be used if desired.

Having thus described my invention, what I claim as new and desire to secure by Letters Patent is:

1. A focusing scale for cameras comprising a base, means for adjustably mounting the base on a camera, a cover for the base adapted to conceal the adjustable mounting on the base, said cover having a focusing scale thereon.

2. A focusing scale for cameras comprising a base, means for adjustably mounting the base on a camera including a flanged opening in the base, fastening means extending through the opening to the camera, a cover over the flanged opening and a focusing scale on the cover.

3. A focusing scale for cameras comprising a base, means for adjustably mounting the base on a camera, including a slot in the base, a registering mark on the base corresponding to a focal graduation, a cover for the slotted base, a focusing scale on the cover, said focusing scale having a graduation corresponding to the graduation on the base, and means for fastening the cover on the base with the graduations in registration.

4. A focusing scale for cameras comprising a base, means for adjustably mounting the base on a camera, a cover for the base, concealed fastening means for holding the cover on the base, said cover having focal graduations thereon.

5. In a camera, the combination with a camera bed, of a lens carriage movably mounted thereon, a focusing scale carried by the camera, said scale comprising a box-like housing, adjustable concealed connection between said housing and camera, and a top for the housing having a scale thereon.

6. In a camera, the combination with a camera bed, of a lens carriage movably mounted thereon, a focusing scale therefor comprising a slotted block, screws passing through the slotted block permitting adjustment thereof relative to the camera, and a cover for the slot and screws adapted to fit on the block, said cover having scale graduations thereon.

7. In a camera, the combination with a camera bed, of a lens carriage movably mounted thereon, a focusing scale carried by the camera, said scale comprising a box-like housing, adjustable concealed connection between said housing and camera, and a top for the housing having a focusing scale thereon, and concealed connections between the top and the box-like housing.

Signed at Rochester, New York, this 23 day of June 1928.

PHILIP W. TIERNEY.